United States Patent

[11] 3,586,134

| [72] | Inventor | Paul J. Westfall<br>2340 N.W. Nicolai St., Portland, Oreg. 97210 |
|---|---|---|
| [21] | Appl. No. | 842,237 |
| [22] | Filed | July 16, 1969 |
| [45] | Patented | June 22, 1971 |

[54] COOLING LIQUID CIRCULATING SYSTEM FOR DISC BRAKE
1 Claim, 5 Drawing Figs.

[52] U.S. Cl. .................................................. 188/71.6,
188/264 P, 192/113 B
[51] Int. Cl. .................................................. F16d 65/84
[50] Field of Search .......................................... 188/264.2,
264.22, 264 P; 192/113 B

[56] References Cited
UNITED STATES PATENTS
| 2,887,961 | 5/1959 | Hawley | 188/264 (.22) X |
| 2,934,177 | 4/1960 | Kelley et al. | 188/264 (.22) |
| 2,971,612 | 2/1961 | Graber | 188/264 PUX |

*Primary Examiner*—George E. A. Halvosa
*Attorney*—L. R. Geisler

ABSTRACT: The rotation of the wheel assembly to which the disc brake is applied causes spring-controlled plungers in a plurality of force pumps to be operated through engagement with cam means, the rotation of the wheel providing relative rotational movement of the plungers with respect to the cam means; the operation of the plungers in the pumps causing cooling liquid to be drawn from a reservoir and delivered to the friction discs, then after passing substantially radially outwardly over the discs, to be delivered back to the reservoir for continued recirculation; the liquid preferably being caused to pass through cooling and straining means in the course of its recirculation.

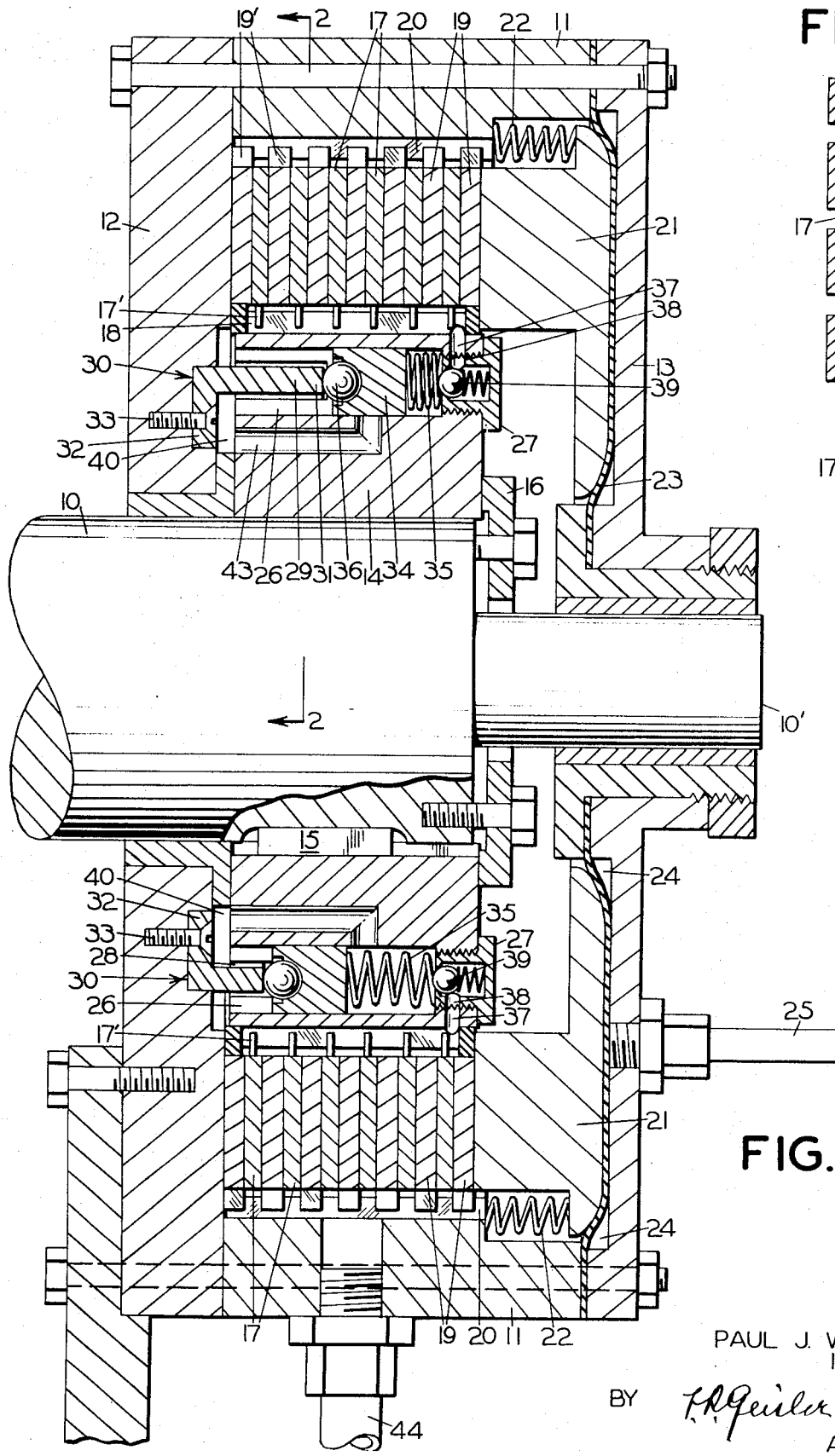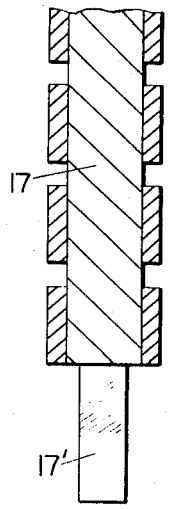
FIG. 5
FIG. 1
PAUL J. WESTFALL
INVENTOR.
BY T.R. Geisler
ATTY.

FIG. 2
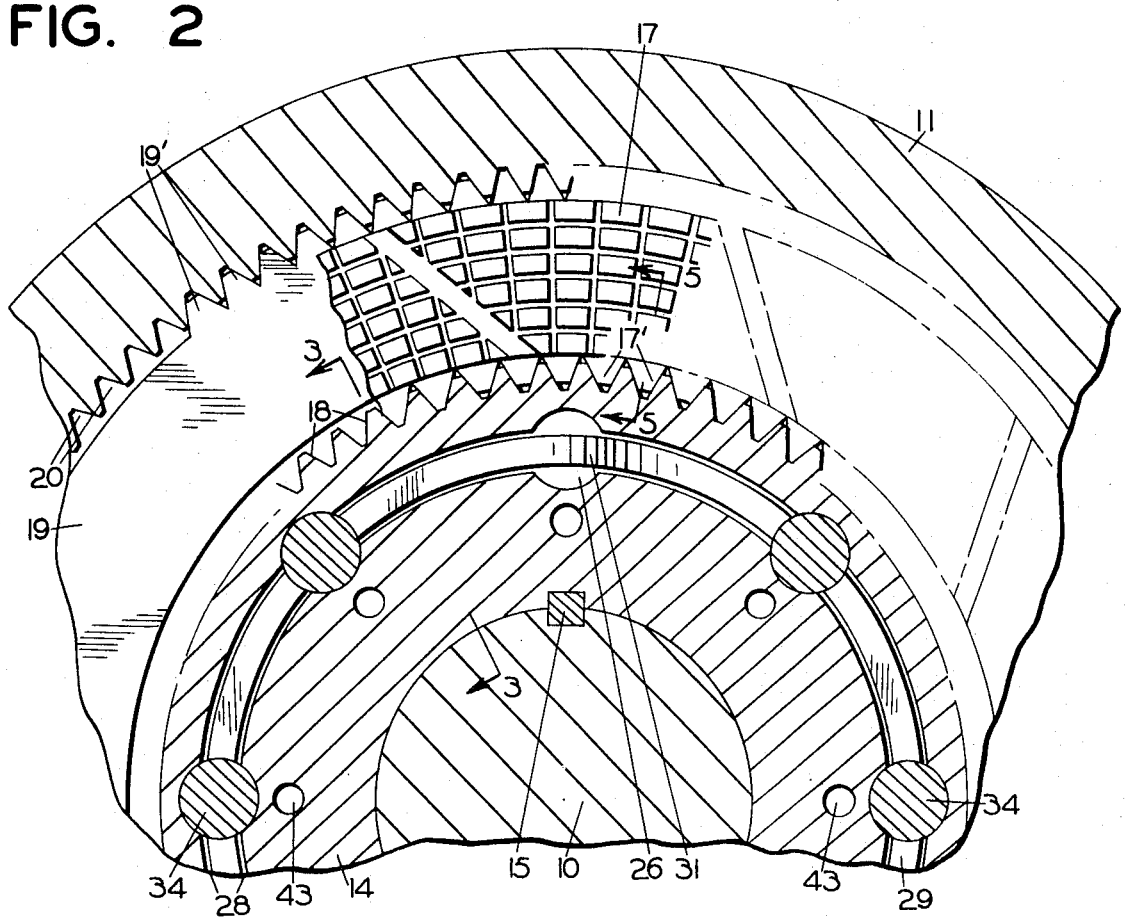
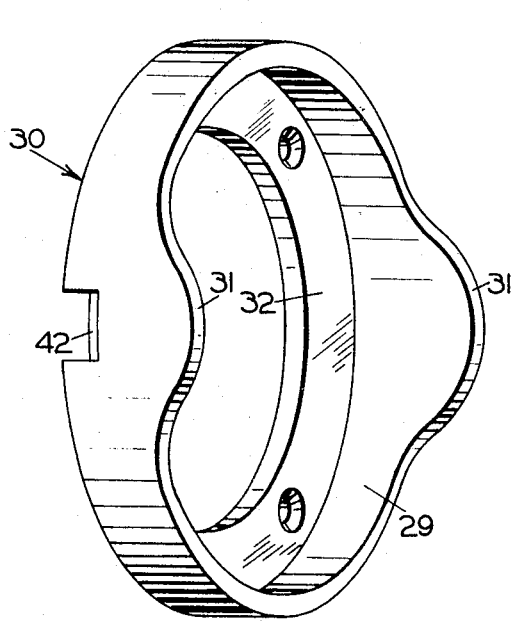
FIG. 4
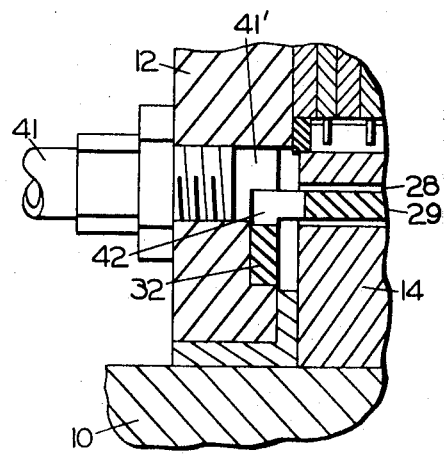
FIG. 3
PAUL J. WESTFALL
INVENTOR.
BY
ATTY.

COOLING LIQUID CIRCULATING SYSTEM FOR DISC BRAKE

BACKGROUND OF THE INVENTION

The necessity for colling or dissipating heat developed from the frictional contact of relatively rotatable parts in disc brake assemblies has long been recognized since otherwise overheating and resulting damage may occur. Various means have been developed for using cooling liquid for this purpose, from the discharging of cooling water over the elements subject to heating and then merely wasting such cooling water, to the more practical procedure of retaining and recirculating the cooling liquid. When entirely external means are used for circulating and recirculating the cooling liquid in the brake assembly, it has been found that back pressure on the seals may cause premature leaks in the system and resulting failure. Furthermore, if the same amount of cooling liquid is circulated and recirculated at a constant circulating rate, regardless of the rotational speed and amount of torque developed, and thus regardless of the amount of frictional heat to be overcome, there may not be enough liquid circulating at a particular time to provide adequate cooling, while an excessive circulation of liquid may occur at other times.

The principal object of the present invention is to provide a simple and practical system for recirculating a supply of cooling liquid in a disc brake assembly whereby the rate at which the cooling liquid is delivered and circulated will be automatically controlled by the speed of rotation of the parts of the assembly which require the cooling. Other objects and advantages attained will be indicated in the course of the subsequent description.

BRIEF SUMMARY OF THE INVENTION

In the embodiment of the invention illustrated and described a continuous cam element in the form of a cylindrical band having an inwardly extending edge formed with alternating high and low portions to provide cam surfaces, engages the outer ends of spring-controlled plungers which, in combination with simple valves, provide individual pumps which, when the plungers are thrust inwardly against the force of their springs, force cooling liquid, drawn from a reservoir, to be delivered directly to the inner peripheries of the friction discs. The liquid moves substantially radially outwardly over the discs and is collected from the outer peripheries and delivered back to the reservoir for recirculation. The frequency with which the individual pumps are operated, and thus the rate at which the cooling liquid is circulated and recirculated, depends on the speed of the relative rotation of the series of pumps with their plungers with respect to the continuous cam element, or, in other words, depends on the speed of rotation of the wheel assembly. Thus the circulation of the cooling liquid is governed by the speed of rotation of the wheel assembly and in this manner adequate without excessive circulation of the cooling liquid automatically takes place.

BRIEF DESCRIPTION OF THE DRAWINGS

In the drawings:

FIG. 1 is a sectional elevation of the disc brake assembly taken longitudinally along the axis of rotation of the shaft to which the brake is applied;

FIG. 2 is a fragmentary sectional elevation taken on line 2–2 of FIG. 1;

FIG. 3 is a fragmentary section on line 3–3 of FIG. 2;

FIG. 4 is a perspective view of the special cam element which engages the spring-controlled plungers of the pumps for circulating the cooling liquid; and FIG. 5 is a fragmentary section, drawn to an enlarged scale, taken transversely through one of the friction discs of the brake assembly.

Referring first to FIG. 1, the shaft to which the brake is applied is indicated at 10, the end of the shaft having a reduced diameter extension 10 mounted in a suitable support bearing. The brake assembly is contained in a liquidtight housing comprising an outer cylindrical casing 11 to which end plates 12 and 13 are bolted, the end plates being provided with suitable seals as shown.

A hub member 14 is keyed on the shaft 10 by suitable keys 15, one of which is shown in FIG. 1, and the hub member 14 is held against longitudinal movement on the shaft 10 by the end ring 16. The hub member 14 carries annular friction discs 17, the inner peripheries of which are formed with teeth 17' which engage longitudinally extending grooves 18 on the periphery of the hub member 14, the discs 17 thus being slidable laterally, to a limited extent on the hub member although rotated with the hub member, (see also FIG. 2).

Cooperating annular friction discs 19 have their outer peripheries similarly formed with teeth 19' which are laterally slidable in longitudinal grooves formed on the inner wall of the stationary cylindrical housing member 11, the discs 19 thus being held against rotation while the discs 17 rotate with the hub. In the performing of the braking operation for the shaft 10 and hub 14 the two cooperating sets of friction discs 17 and 19 are thrust into frictional contact by an annular thrust member 21 which is moved (to the left as viewed in FIG. 1) against the opposing force of its springs 22 when acted upon by a diaphragm 23. The diaphragm 23 extends over an annular sealed chamber 24 and the delivery of brake-actuating fluid under pressure through the conduit 25 into the sealed chamber 24 causes the diaphragm 23 and therewith the thrust member 21 to be moved forwardly against the force of the springs. This arrangement of friction discs with similar means for moving them into frictional engagement is old and well known and need not be further described.

For the carrying out of the present invention the hub member 14 is formed with a plurality (thus eight in the particular example illustrated) of identical, regularly spaced cylindrical channels 26 extending longitudinally through the hub and all located the same distance radially from the axis of the shaft and hub. Each of these channels carries a closure plug 27 at one end and, in combination with the plug, serves as a housing for a force pump as presently described.

The hub 14 is also formed with a circular slot 28 (FIG. 2), concentric with the axis of the shaft and hub, the centerline of the slot 28 intersecting the diameters of the channels 26, the slot 28 thus passing transversely through the end portion of each channel 26 opposite to the end portion in which the closure plug 27 is mounted. The circular slot 28 accommodates the inwardly extending cylindrical wall 29 of a stationary cam element 30 (FIG. 4). The rim of the wall 29 of the cam element is formed with a pair of cam lobes 31. The cam element 30 has a circular mounting flange 32 which is secured in a corresponding circular recess in the end wall 12 of the brake assembly housing by suitable screws 33 (FIG. 1).

A pump plunger 34 is slidably mounted in each of the cylindrical channels 26. A coil spring 35 in each channel 26 is held under compression between the closure plug 27 and the opposed end of the plunger 34. The opposite or outer end of each plunger 34 carries a bearing ball 36 which engages the cam-shaped rim of the wall 29 of the cam element 30 and which a—cts as a cam follower, being held against the cam surface through the pressure exerted by the coil spring 35. Thus the rotation of the hub 14, carrying with it the plungers 34 in their respective channels or housings 26, results in the plungers moving inwardly and outwardly as their bearing balls 36 move along the raised lobes and intervening lower portions of the wall of the stationary cam element 30.

Each of the cylindrical channels 26 in the hub member 14 is provided with a short passageway 37 (FIG. 1) leading radially outwardly to a groove 18 in which an inner peripheral tooth 17' of each of the friction discs 17 is mounted. The closure plug 27 is provided with a side outlet passageway 38 which is positioned in registration with the passageway 37. The closure plug 27 is also provided with a spring-mounted ball check valve 39 so arranged as to permit liquid to pass into the closure plug and out through the joint passageway 38—37, but preventing flow in the reverse direction.

The depth of the circular recess in the wall 12 in which the flange 32 of the cam element 30 is secured is greater than the thickness of the flange 32 and the remaining open portion of the recess constitutes a circular channel 40 through which brake-cooling liquid is supplied. The cooling liquid is delivered into this channel 40 from an external reservoir (not shown) through a conduit 41 (FIG. 3) and passageway 41' which leads to an opening 42 (see also FIG. 4) in the cam element 30 and thereby to the circular channel 40.

A passageway 43 (FIG. 1) is provided in the hub member 14 parallel to and located a slight distance radially inwardly from each of the channels 26. This passageway 43 leads in from the circular channel 40 in the end wall 12 to an intermediate point in the channel 26 and serves as the intake port for the pump housing formed by the channel 26 upon the reciprocation of the spring-controlled, cam-actuated plunger 34.

Thus, as will now be understood from the preceding brief description, and with reference particularly to FIG. 1, rotation of the shaft 10 and hub member 14, producing reciprocation of the plungers 34 in the pump assemblies in the channels 26 through actuation received from the stationary cam element 30, will cause cooling liquid from the circular delivery channel 40 to be drawn in through the passageways 43 and forced out through the passageways 38—37 to the periphery of the hub member 14 and thence, with the aid of centrifugal force, to be delivered over the surfaces of the friction discs to the outer peripheries of the same, and discharged from the friction discs onto the inner wall of the cylindrical housing member 11.

An outlet conduit 44 (FIG. 1) leads from the bottom of the housing member 11 back to the reservoir (not shown) for the cooling liquid, from which, as previously mentioned, the liquid is again delivered to the brake assembly through the conduit 41 and delivery channel 40 (FIG. 3) for recirculation through the entire disc brake assembly.

Preferably, in the course of its passage to and from the external reservoir, the cooling liquid will be subjected to cooling and will also be passed through a suitable strainer to prevent the accumulation of foreign matter in the cooling liquid. Since the external cooling and straining of coolants for friction discs is known to be old, these particular additions to the system are not shown and no claim of novelty is made for them.

The friction discs 17 and 19 preferably are formed with lands and channels on their surfaces as indicated in FIGS. 2 and 5, to facilitate the passage of a cooling liquid over their faces. Various formations and patterns for the surfaces of friction discs facilitating the passage of coolants thereover have been suggested in prior patents.

In the present invention each of the individual pump assemblies causes cooling liquid to be delivered to a section of the inner peripheries of the friction discs in a definitely positive manner through the shortest and most direct route. The employment of a plurality of identical and equally distributed pump assemblies, each functioning positively in the same manner, insures equalized distribution of the cooling liquid throughout the friction discs since the same amount of cooling liquid is distributed with each operation of each pump assembly. The problem, heretofore encountered with other recirculating cooling systems, of back pressure, seal failure, uneven cooling, and loss of coolant, are minimized if not entirely eliminated. For most important of all, the rate at which the cooling liquid is distributed over the discs is determined by the rapidity with which the various pump assemblies operate, which is automatically controlled by the speed of the brake. Consequently, with increased speed and resulting increased frictional heat a correspondingly more rapid delivery and circulation of the cooling liquid automatically takes place to alleviate the frequently encountered problem of inadequate cooling being provided in disc brake assemblies when the need is greatest.

I claim:

1. In a disc brake assembly including a stationary housing enclosing a portion of a rotating shaft with a hub and including nonrotating friction discs supported at their outer peripheries in the stationary housing and rotating friction discs supported at their inner peripheries on the hub, a plurality of identical pump assemblies located in the hub, the housings for said pump assemblies comprising cylindrical channels having their axes parallel to the hub axis and located equidistant therefrom, a plunger in each pump assembly, a spring engaging each plunger, a cam element mounted in the stationary housing for operating said pump assemblies, said cam element including a cylindrical wall concentric with said axis of rotation, the adjacent sidewall of said hub having a circular slot to accommodate said cylindrical wall of said cam element, said slot in said hub extending through the ends of said channels in said hub constituting the housings for said pump assemblies, the rim of said cylindrical wall of said cam element having a cam lobe, said cam element operating to thrust said plungers in succession inwardly against the force of their springs and thereby operate said pump assemblies, an inlet port and outlet port in each pump assembly, means for delivering cooling liquid from a common source to each of said inlet ports, a channel leading from each of said outlet ports to the nearest portion of the periphery of said hub, whereby the rotation of said hub in said housing will cause said pump assemblies to be operated by said cam element and cooling liquid to be delivered to the inner peripheries of said discs, and means for returning the cooling liquid collected at the outer periphery of said discs in said housing to the common source of the cooling liquid for recirculation, and whereby the amount of cooling liquid circulated will be governed by the rate at which said pump assembly is operated and thus by the speed of rotation of said hub.